Patented Aug. 14, 1934

1,970,275

UNITED STATES PATENT OFFICE 1,970,275

COMPRESSED YEAST PRODUCT

William H. Buhrig, Mount Vernon, and Alfred Schultz and Charles N. Frey, New York, N. Y., assignors, by mesne assignments, to Standard Brands Incorporated, Dover, Del., a corporation of Delaware No Drawing. Application July 23, 1929, Serial No. 380,457

12 Claims. (Cl. 99—10)

This invention relates to compressed yeast for use in the baking of bread or the like, and, more particularly, to a compressed yeast product having improved baking qualities; and to methods of making the same.

A general object of the invention is to incorporate with bakers' yeast materials acting to improve its baking and keeping qualities without affecting its general physical characteristics.

Another object of the invention is to incorporate with bakers' yeast materials which will maintain the baking strength of the compressed yeast in the cake and stimulate and assist the activity of the yeast in the dough batch whereby improved baking effects will result.

Other objects of the invention will in part be obvious and will in part appear hereinafter.

The invention accordingly comprises the several steps and the relation of one or more of such steps with respect to each of the others, and the product possessing the features, properties and the relation of constituents, which are exemplified in the following detailed disclosure, and the scope of the application of which will be indicated in the claims.

The use of nitrogen- and calcium-supplying materials and so-called oxidizing salts, such as bromates, iodates and persulphates, in breadmaking is well-known. Such materials are believed to act to stimulate the activity of the yeast and assist in the conditioning of the dough, and have heretofore been added directly to the dough ingredients during the mixing operation.

As ordinarily used in bread-making, yeast is supplied to the baker in compressed blocks and contains about 70% of moisture. Upon standing in a compressed state yeast ordinarily gradually loses its baking strength so that, although the yeast might have excellent baking strength when first compressed, its baking strength would be reduced considerably by the time it is used by the baker. This is particularly true where the baker fails to use the yeast immediately upon delivery.

In accordance with the principles of the present invention there is added to the compressed yeast, materials which are relatively insoluble, as in the case of mucic acid, or relatively inert, as in the case of urea, and these do not tend appreciably to alter the balance of liquid within and without the cell walls of the yeast after mixing.

A substance which is particularly advantageous as a nitrogen source is urea or carbamide which is comparatively inert or inactive with respect to compressed yeast and tends to maintain the baking strength thereof for a period of several days when reasonable precautions are taken to keep the yeast cool. Improved results are obtained when it is admixed with the yeast in amounts of from 0.1% to 5%. Other suitable nitrogen materials are the amino acids and the amides, and they may be used in corresponding amounts. If ammonium salts of inorganic acids are used, only traces can be employed,—usually not over .2%.

In addition to a source of nitrogen, it is preferred to admix with the yeast a relatively insoluble substance having an acid reaction, such as, for example, mucic acid, adipic acid, fumaric acid, potassium bitartrate, or calcium acid phosphate. The calcium acid phosphate performs a dual function in that it also serves as a source of calcium and aids in the conditioning of the gluten in the dough batch. It is also to be understood that, without departing from the spirit of the invention, other calcium salts, such as, for example, calcium sulphate, as well as oxidizing salts, may be added. The amount of acid-supplying ingredient to be admixed with the yeast should be such as to produce an acidity expressed as pH, of from 4.5 to 5.5.

As an alternative to the addition of nitrogen materials to the yeast such as are above referred to advantage can be taken, if desired, of the fact that nitrogenous materials are normally present in the dough batch which, if rendered assimilable, may be utilized by the yeast to accomplish a similar result. For this reason, if desired, a part, or all, of the added nitrogenous materials may be omitted from the mixture and a proteolytic enzyme, such as papain, added to the yeast in an amount of, for example, from about 0.1% to 2% thereof.

It will thus be seen that by means of the present invention there has been provided a compressed yeast product of keeping quality, of improved baking properties, and which maintains such properties over an extended period of time, and since certain changes may be made in carrying out the above process, and certain modifications in the product which embodies the invention may be made without departing from its scope, it is intended that all matter contained in the above description shall be interpreted as illustrative and not in a limiting sense.

It is also to be understood that the following claims are intended to cover all of the generic and specific features of the invention herein described, and all statements of the scope of the invention which as a matter of language might be said to fall therebetween.

Having described our invention, what we claim as new and desire to secure by Letters Patent is:

1. As a new article of manufacture a compressed yeast product of improved baking quality, comprising, in combination, compressed yeast admixed with from 0.1% to 5% of a relatively inert nitrogen-supplying material.

2. As a new article of manufacture a compressed yeast product of improved baking quality, comprising, in combination, compressed yeast admixed with from 0.1% to 5% of urea.

3. As a new article of manufacture a compressed yeast product of improved baking and keeping quality, comprising, in combination, compressed yeast admixed with from 0.1% to 5% of a relatively inert nitrogen-supplying material and a small amount of a relatively insoluble substance having an acid reaction.

4. As a new article of manufacture a compressed yeast product of improved baking and keeping quality, comprising, in combination, compressed yeast admixed with from 0.1% to 5% of urea and a small amount of mucic acid.

5. As a new article of manufacture a compressed yeast product of improved baking and keeping quality, comprising, in combination, compressed yeast admixed with from 0.1% to 5% of urea and an amount of calcium acid phosphate sufficient to give to the mixture an acidity expressed as pH of from 4.5 to 5.5.

6. As a new article of manufacture a compressed yeast product of improved baking and keeping quality, comprising, in combination, compressed yeast admixed with 0.1% to 5% of urea, sufficient calcium acid phosphate to give an acidity expressed as pH of from 4.5 to 5.5 and a small amount of an oxidizing salt.

7. As a new article of manufacture a compressed yeast product of improved baking quality, comprising in combination compressed yeast admixed with from 0.1% to 5% of a relatively inert nitrogen supplying material, and from 0.1% to 2% of papain.

8. As a new article of manufacture a compressed yeast product of improved baking and keeping quality, comprising in combination compressed yeast admixed with from 0.1% to 5% of a relatively inert nitrogen supplying material, from 0.1% to 2% of papain, and a small amount of mucic acid.

9. As a new article of manufacture a compressed yeast product of improved baking and keeping quality, comprising in combination compressed yeast admixed with from 0.1% to 5% of a relatively inert nitrogen supplying material, and a small amount of a material of the empirical class consisting of mucic acid, adipic acid, fumaric acid, potassium bitartrate, and calcium acid phosphate.

10. As a new article of manufacture a compressed yeast product of improved baking quality, comprising in combination compressed yeast admixed with from 0.1% to 5% of a relatively inert nitrogen supplying material, and a small amount of an oxidizing salt.

11. As a new article of manufacture a compressed yeast product of improved baking and keeping quality, comprising in combination compressed yeast admixed with from 0.1% to 5% of a relatively inert nitrogen supplying material, a small amount of an oxidizing salt, and a small amount of a material of the empirical class consisting of mucic acid, adipic acid, fumaric acid, potassium bitartrate, and calcium acid phosphate.

12. As a new article of manufacture a compressed yeast product of improved baking and keeping quality, comprising in combination compressed yeast admixed with from 0.1% to 5% of a relatively inert nitrogen supplying material, a small amount of an oxidizing salt, from 0.1% to 2% of papain, and a small amount of a material of the empirical class consisting of mucic acid, adipic acid, fumaric acid, potassium bitartrate, and calcium acid phosphate.

WILLIAM H. BUHRIG.
ALFRED SCHULTZ.
CHARLES N. FREY.